Dec. 20, 1938.  L. L. HART  2,140,871

AGRICULTURAL ROTOR

Filed June 22, 1937

Inventor
Leonard Lesslie Hart,
by Royal E Burnham,
attorney.

Patented Dec. 20, 1938

2,140,871

UNITED STATES PATENT OFFICE 2,140,871

AGRICULTURAL ROTOR

Leonard Lesslie Hart, Northmead, New South Wales, Australia

Application June 22, 1937, Serial No. 149,761
In Australia January 15, 1937

1 Claim. (Cl. 97—216)

This invention relates to improved means for effecting rotation of agricultural, horticultural, and the like implement parts and tools such as cultivator points, picks, tines, hoe blades, root cutters, and the like, and has been devised to reduce maintenance costs and the risk of breaking implement tools, to facilitate adjustment and renewal of working parts, and to obtain maximum efficiency of operation.

A driven shaft, adapted to be rotated through gear or chain drive from a power driven shaft on a tractor or similar hauling machine, is fitted with a longitudinal series of independent casing sections each and all of which are adapted to be rotated by the driven shaft and each and all of which are adapted to remain stationary while the driven shaft revolves. Each casing section is provided with a tool carrier, and each tool carrier is adapted to be fitted with any desired number of detachable earth working tools.

In the accompanying drawing which illustrates one form of the invention:—

Figure 1:
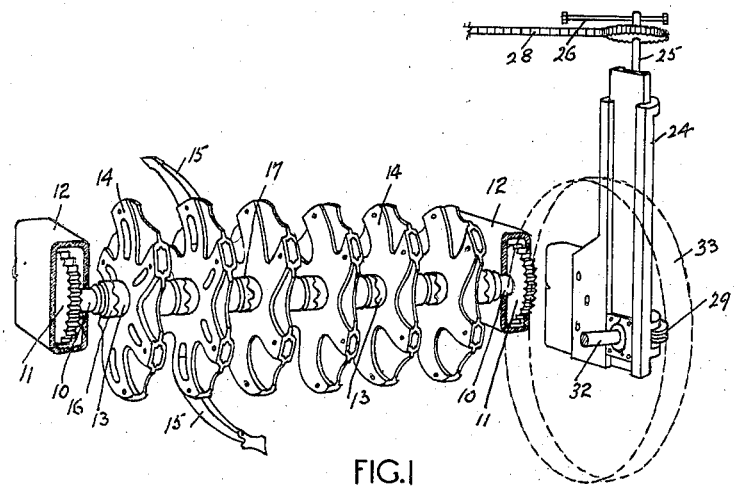
Fig. 1 is a perspective of a rotor with side framing and one ground wheel omitted.
Figure 2:
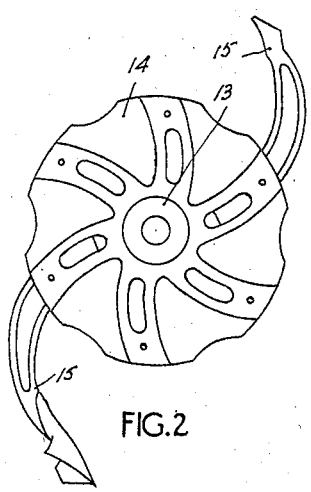
Fig. 2 is a side elevation of one form of tool carrier.
Figure 3:
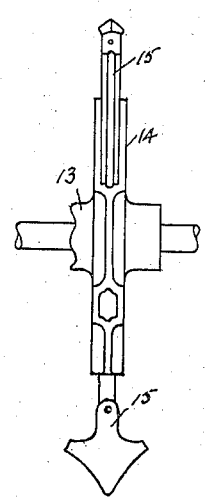
Fig. 3 is an end elevation of the same.
Figure 4:
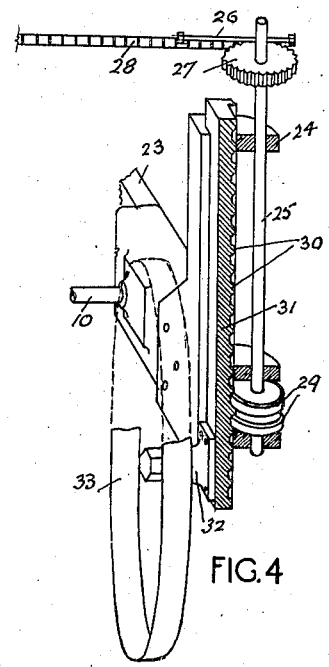
Fig. 4 is a perspective view and part sectional elevation of ground wheel adjusting means.

A driven shaft 10 is fitted at each of its ends with a gear wheel 11 in a gear box 12 and is adapted to be rotated by means of a driven shaft on a tractor or the like hauling machine.

Casing sections 13, individually laterally slidable and rotatable on the shaft 10 and each provided with an independent tool carrier 14, are mounted on bushes about the shaft and, normally, are spring held for rotation by the shaft. Each tool carrier is adapted to be fitted with any desired number of detachable and longitudinally adjustable earth working tools 15.

Figure 5:
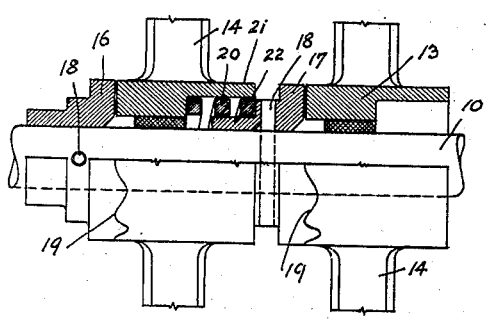
Fig. 5 is a part sectional elevation of one form of automatic releasing means of a casing section on a driven shaft.

As an illustration of means whereby each casing section and its tool carrier may be rotated by and with the driven shaft or may be held stationary while the shaft rotates, Fig. 5 shows an end spacing member 16 and an inner spacing member 17 between two casing sections. Each spacing member, by means of a through pin 18, is fast on the shaft 10, and the contacting faces of the casing sections and the adjacent spacing members are formed as interlocking slipping clutch faces 19.

Between a casing section 13 and the inner spacing member 17 is a stout coiled spring 20 in compression. The spring encircles the shaft 10 and is housed between the extended hub 21 of the casing section and the extended hub 22 of the spacing member. The hub 21 serves to exclude dust and dirt and to prevent escape of grease lubricant, and the spring 20 forces the clutch face of the casing section into gripping contact with the clutch face on the spacing member 16.

Should a tool 15 on a casing section strike a relatively fixed obstacle or obstruction in the soil and be unable to rotate with the shaft 10, the shaft continues to rotate with the result that the clutch face on the adjacent spacing member, pressing against the clutch face on the said casing section, forces the casing section laterally along the shaft against the resistance of the spring 20. When the rotor has travelled forward sufficiently to withdraw the stationary tool from the obstruction the compressed spring returns the casing section into interlocking engagement with the spacing member.

Since each casing section on the shaft is similarly associated with a clutch faced spacing member and with a similar coiled spring 20 any one casing section or any number of the casing sections may be rotated by and with the shaft 10, and any one or any number of the casing sections may be held stationary while the shaft rotates.

Each gear box 12 is bolted to a side framing 23, and to each framing is bolted a vertical metal frame 24 which carries a rotatable and non-sliding spindle 25. The upper end of each spindle is fitted with a manually rotatable arm 26 and with a sprocket wheel 27 provided with an endless sprocket chain 28. To the lower end of each spindle are pinned two spaced rack wheels 29, 29 with which inclined rack bars 30 of a vertically movable rack plate 31 are adapted to engage.

A stub axle 32 for a ground wheel 33 is secured to each of the rack plates 31 so that on rotating one of the arms 26 the framing 23 carrying the rotor may be raised or lowered relatively to the ground level and thus regulate the depth of cut by the tools 15. In the same manner the tools may be raised above ground level for road transport or the like.

The compression of each spring 20 may be increased by inserting a washer between the spring and the shoulder of the spacing member.

I claim:

In a tilling machine, a driven shaft, spacing members fast thereon and each having a radial clutch face, and some of said members also having an axially-extending hub opposite to its clutch face, and casing members between said spacing members adapted to carry earth-working tools, some of said casing members each having at one side a clutch face engaging the clutch face of a spacing member, and having also a hub on its other side axially extending over the extended hub of a spacing member, and a coil spring between adjacent spacing and casing members urging a casing member into clutch contact with a spacing member, said spring being disposed between the extended hub portions of said members and being substantially covered by that of a casing member.

LEONARD LESSLIE HART.